(12) United States Patent
Hannuksela et al.

(10) Patent No.: US 8,831,039 B2
(45) Date of Patent: Sep. 9, 2014

(54) TIME-INTERLEAVED SIMULCAST FOR TUNE-IN REDUCTION

(71) Applicant: Core Wireless Licensing S.A.R.L, Luxembourg (LU)

(72) Inventors: Miska Hannuksela, Ruutana (FI); Vinod Kumar Malamal Vadakital, Bangalore (IN); Imed Bouazizi, Tampere (FI)

(73) Assignee: Core Wireless Licensing S.a.r.l, Luxembourg (LU)

( * ) Notice: Subject to any disclaimer, the term of this patent is extended or adjusted under 35 U.S.C. 154(b) by 0 days.

(21) Appl. No.: 13/793,589

(22) Filed: Mar. 11, 2013

(65) Prior Publication Data

US 2013/0242972 A1    Sep. 19, 2013

Related U.S. Application Data

(63) Continuation of application No. 11/758,613, filed on Jun. 5, 2007, now Pat. No. 8,396,082.

(51) Int. Cl.
*H04N 21/438* (2011.01)
*H04H 20/20* (2008.01)
*H04N 21/643* (2011.01)
*H04N 21/414* (2011.01)
*H04L 1/00* (2006.01)

(52) U.S. Cl.
CPC .......... *H04H 20/20* (2013.01); *H04N 21/64315* (2013.01); *H04N 21/4384* (2013.01); *H04N 21/41407* (2013.01); *H04L 2001/0093* (2013.01); *H04L 1/0057* (2013.01); *H04L 1/0068* (2013.01)
USPC .......................................... 370/473; 370/528

(58) Field of Classification Search
CPC .............. H04H 20/20; H04N 21/4384; H04N 21/64315; H04L 1/0057; H04L 1/0068
USPC ............. 370/310, 312, 473, 528; 375/240.26, 375/240.27
See application file for complete search history.

(56) References Cited

U.S. PATENT DOCUMENTS

2001/0053142 A1    12/2001   Abe et al.
2005/0021814 A1    1/2005    Wang
(Continued)

FOREIGN PATENT DOCUMENTS

EP    1684450 A2    7/2006
WO    2006031925 A2    3/2006
(Continued)

OTHER PUBLICATIONS

International Search Report for PCT Application No. PCT/IB2008/052130 dated Sep. 11, 2009.
(Continued)

*Primary Examiner* — Paul H Masur
(74) *Attorney, Agent, or Firm* — Ziegler IP Law Group

(57) ABSTRACT

A method includes generating a first coded data stream and a second coded data stream both representing the same content, the first coded data stream and the second coded data stream being independently decodable from each other, transmitting portions of the first coded data stream in first and second time-sliced bursts, and transmitting a portion of the second coded data stream in a third time-sliced burst, where the transmission of the portions of the first and second coded data streams do not overlap with each other, and occur subsequently to each other in transmission order and substantially without delay between transmission of data.

20 Claims, 9 Drawing Sheets

(56) References Cited

U.S. PATENT DOCUMENTS

| | | |
|---|---|---|
| 2006/0085551 A1 | 4/2006 | Xie et al. |
| 2006/0262810 A1 | 11/2006 | Vadakital et al. |
| 2007/0110105 A1 | 5/2007 | Usuki et al. |
| 2007/0153914 A1* | 7/2007 | Hannuksela et al. .... 375/240.26 |
| 2008/0037656 A1* | 2/2008 | Hannuksela ............. 375/240.26 |
| 2008/0170531 A1 | 7/2008 | Petry et al. |
| 2008/0216116 A1* | 9/2008 | Pekonen et al. ................ 725/39 |
| 2008/0275905 A1 | 11/2008 | Hannuksela |
| 2008/0301742 A1* | 12/2008 | Hannuksela et al. ......... 725/105 |
| 2009/0055715 A1 | 2/2009 | Jashek et al. |
| 2009/0290633 A1* | 11/2009 | Oh et al. .................. 375/240.01 |

FOREIGN PATENT DOCUMENTS

| | | |
|---|---|---|
| WO | 2006061765 | 6/2006 |
| WO | 2006114830 A3 | 11/2006 |
| WO | 2007053734 A4 | 5/2007 |

OTHER PUBLICATIONS

Partial Search Report for PCT Application No.~PCT/IB2008/052130 dated Jul. 9, 2009.

Jaekel, T., "Time-Slices-Wesentliches Merkami Von DVB-H". FKT Fernseh Und Kinotechnik, Fachverlag Schiele & Schon GmBH., Berlin, De., vol. 60, No. 3, Jan. 1, 2009, pp. 135-138.

* cited by examiner

--PRIOR ART--

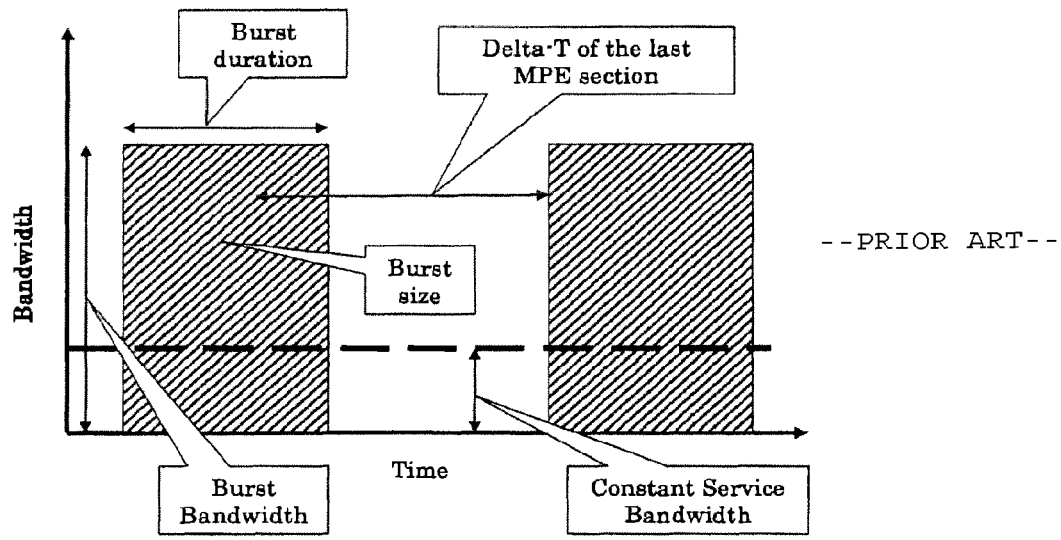
FIG. 2(a) --PRIOR ART--
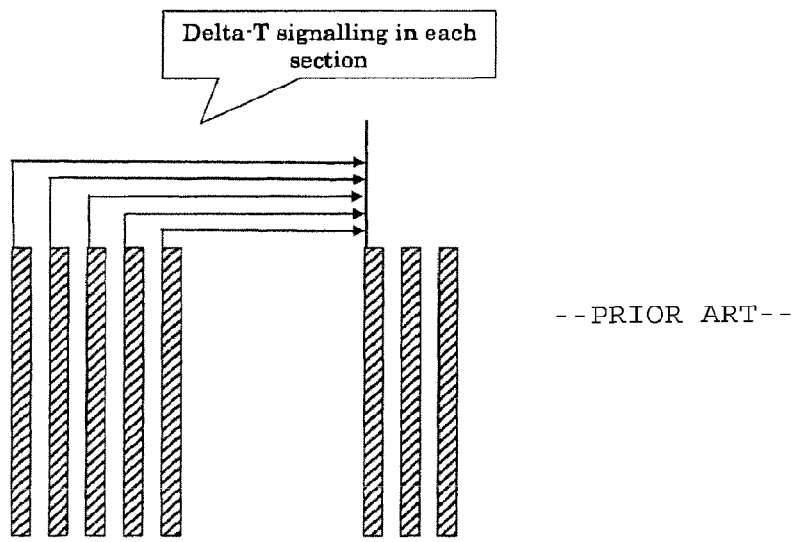
FIG. 2(b) --PRIOR ART--

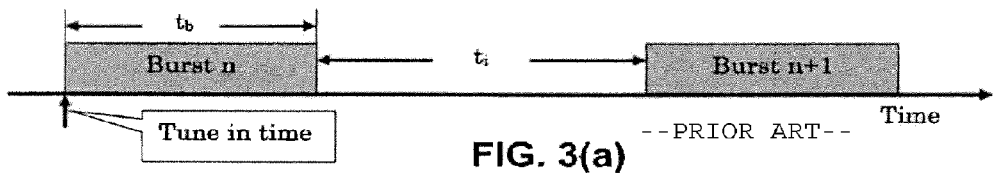
FIG. 3(a) --PRIOR ART--
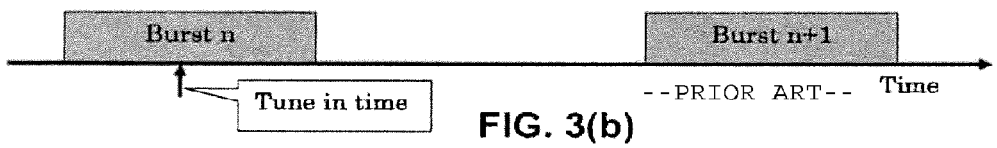
FIG. 3(b) --PRIOR ART--
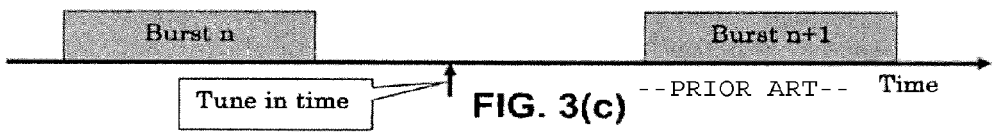
FIG. 3(c) --PRIOR ART--
FIG. 4
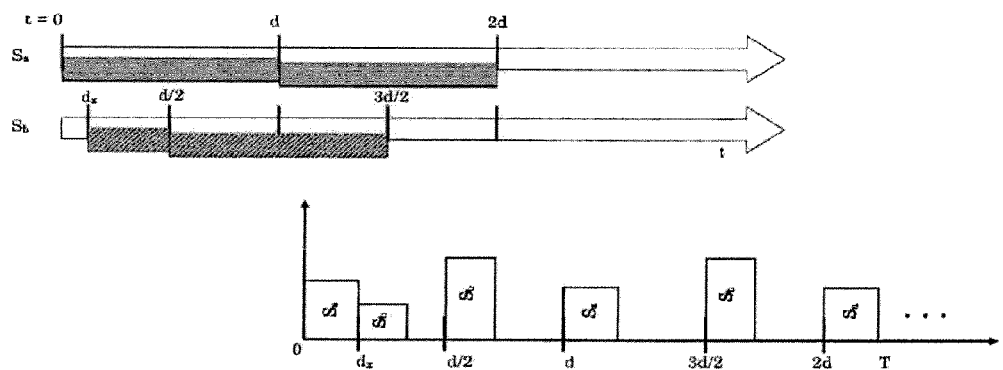

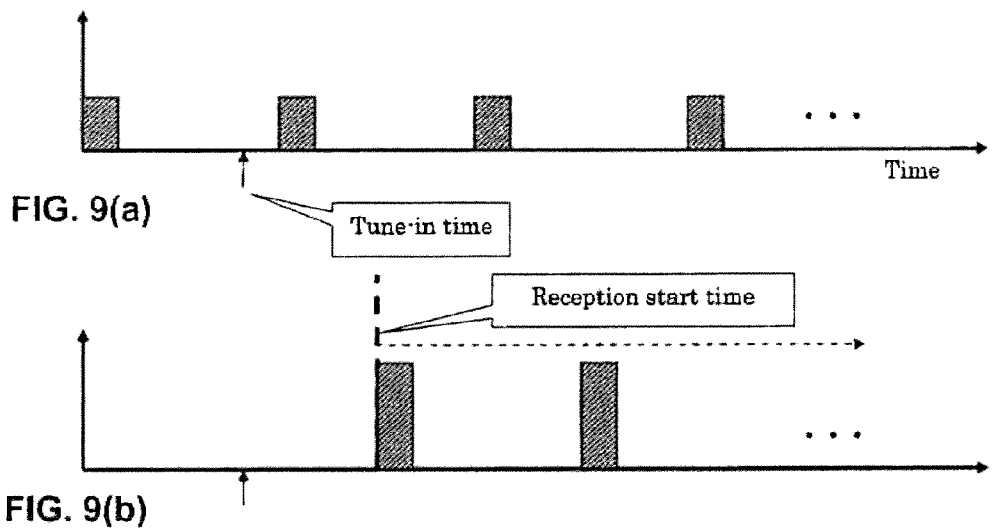
FIG. 9(a)
FIG. 9(b)
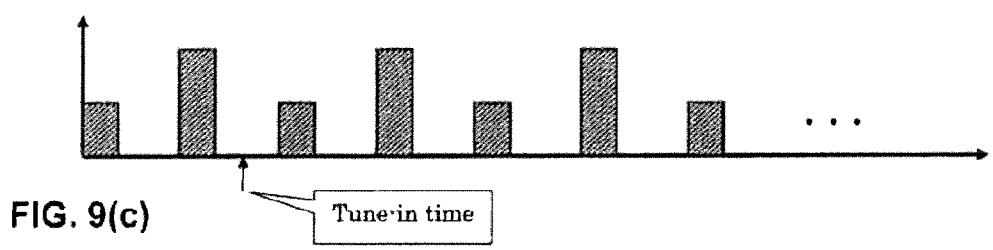
FIG. 9(c)
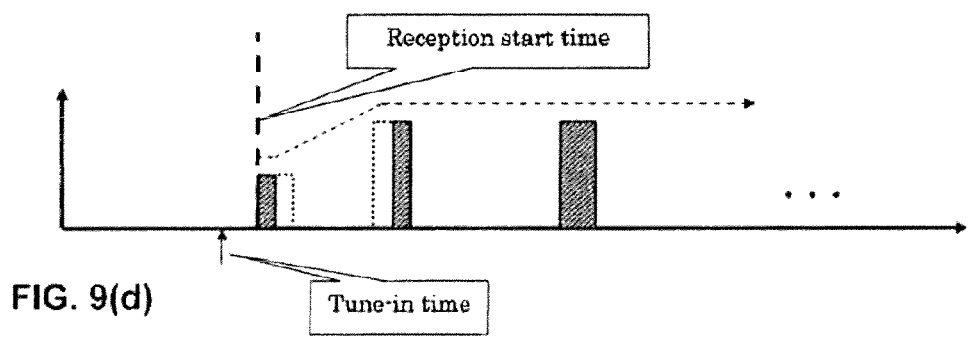
FIG. 9(d)

TIME-INTERLEAVED SIMULCAST FOR TUNE-IN REDUCTION

CROSS-REFERENCE TO RELATED APPLICATIONS

This application is a continuation of U.S. application Ser. No. 11/758,613, filed on Jun. 5, 2007, issued as U.S. Pat. No. 8,396,082, the disclosure of which is incorporated herein by reference in its entirety

FIELD OF THE INVENTION

The present invention relates generally to the transmission of media streams over a Digital Video Broadcasting channel, whereby the media datagrams of an identical source but of different transmission and presentation characteristics are simulcast.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The Digital Video Broadcasting (DVB) Project is a European initiative to provide a common specification for delivering high bandwidth digital multimedia contents to set-top boxes and television sets in a direct-to-home setting. This initiative has been adopted by several countries worldwide. The basic core standards are classified based on the physical transmission mechanisms they are specialized for. These standards are the Digital Video Broadcasting-Satellite (DVB-S); Digital Video Broadcasting-Cable (DVB-C); and Digital Video Broadcasting-Terrestrial (DVB-T).

DVB-T is also referred to as the "Common 2k/8k specification." The multi-carrier modulation system used by DVB-T provides additional robustness in the presence of noise. It also enables the possibility to transmit in a large single frequency network (SFN), reusing frequencies within the network. Orthogonal Frequency Division Multiplexing (OFDM) is used by DVB-T in two modes: the 2K mode, which uses 1705 carriers, and the 8K mode, which uses 6817 carriers. The size of the SFN depends on the modes used: the 2K mode having a smaller SFN with a single transmitter than an 8K mode.

DVB-T mobile services have been launched in various locations. Using diversity antenna receivers, services which targeted fixed antenna reception can now also be received on the move. However, even though DVB-T has passed most suitability requirements for mobile applications, some concerns regarding data delivery for small handheld, battery-operated devices remained. Handheld mobile terminals require specific features from the transmission system serving them. These features include (1) extended receiver battery life; (2) improved radio frequency (RF) performance for mobile single antenna reception; (3) countering high levels of noise in a hostile transmission environment; and (4) efficient handovers. The Digital Video Broadcasting Handheld (DVB-H) standard has been developed. DVB-H uses the same basic concepts of DVB-T but adds additional features to improve mobility, power consumption and SFN usability.

DVB systems were originally designed to transmit digital multimedia contents to consumers directly to their homes. However, it was also recognized that the same transmission system is useful for broadcasting to consumers other types of data such as firmware updates for set-top boxes, games for set-top boxes, program guides, Internet services, and proprietary data such as stock market information. This broadcasting of data is referred to as datacasting. Depending on the different types of applications that can use datacasting and their requirements, six different profiles were defined. These profiles are: (1) data piping; (2) data streaming; (3) multi-protocol encapsulation (MPE); (4) data carousels; (5) object carousels; and (6) other protocols. For addressable data, such as data using Internet Protocol (IP) for transmission, the MPE profile is the most appropriate profile. DVB-H is designed to be IP-based, and it therefore uses MPE as the datacasting profile.

MPE-Forward Error Correction (MPE-FEC) is an optional multiplexer-layer FEC code based on Reed-Solomon (RS) codes. MPE-FEC is included in the DVB-H specifications to counter high levels of transmission errors. In MPE-FEC, the RS parity data is packed into a special FEC section referred to as MPE-FEC so that an MPE-FEC-ignorant receiver can simply ignore these sections. The computation of MPE-FEC is performed in the link layer, over IP packets before encapsulation into MPE sections.

In the following, the values correspond to the current standard. An MPE-FEC frame is arranged as a matrix with 255 columns and a flexible number of rows. Currently, column heights of 256, 512, 768, 1024 bytes are supported. FIG. 1 shows the structure of an MPE-FEC frame. Each position in the matrix hosts an information byte. The first 191 columns are dedicated to Open Systems Interconnection (OSI) layer 3 datagrams, such as IP packets, and possible padding. This portion of the MPE-FEC frame is referred to as the application data table (ADT). The next 64 columns of the MPE-FEC frame are reserved for the RS parity information. This portion is referred to as the RS data table (RSDT).

The ADT can be completely or partially filled with datagrams. The remaining space, when the ADT is partially filled, is padded with zero bytes. Padding is also performed when there is no space left in the MPE-FEC frame to fill the next complete datagram. The RSDT is computed across each row of the ADT using RS (255, 191). It is not necessary to compute the entire 64 columns of parity bytes, and some of the right-most columns of the RS data table can be completely discarded. This procedure is referred to as puncturing. The padded and punctured columns are not sent over the transmission channel.

The strict constraint on power consumption was a significant shortcoming of DVB-T and hence made it unsuitable for handheld mobile terminals. Handheld mobile devices have a limited source of power. The power consumed in receiving, decoding and demodulating a standard full-bandwidth DVB-T signal would use up a substantial amount of battery life in a short period of time. Time slicing of the MPE-FEC frames was used to solve this problem. Time slicing is similar to time division multiplexing (TDM). In TDM, multiple data streams are sent over the same channel by assigning each data stream unique slots in time. An advantage of TDM is its flexibility by allowing dynamic variations in the number of signals sent in the channel and the ability to constantly adjust time intervals to make optimal usage of the channel bandwidth.

When time-slicing is used, the data of a time-sliced service is sent into the channel as bursts so that the receiver, using the control signals, remains inactive when no bursts are to be received. This reduces the power consumption in the receiver terminal. The bursts are sent at a significantly higher bit rate, and the inter-time-slice period, also referred to as the off-time, is usually proportional to the average bitrate of the service(s) conveyed in the bursts. FIG. 2(a) shows the time-slicing of bursts with the various parameters that characterize it. Each burst typically consists of two parts, the ADT and RSDT. Consequently, the burst time consists of the burst time for ADT and the burst-time for RSDT. Analogously, after the transmission of the ADT of a burst, no application data of a certain program is transmitted for a time duration; referred to herein as the effective off-time.

A method referred to as the "delta-t method" is used to indicate the time interval that a receiver can switch off before it can switch back on to receive the next time slice of the service. The delta-t method is used to signal the time from the start of the currently-received MPE (or MPE-FEC) section to the start of the next burst. Delta-t times are indicated in every MPE section header, as illustrated in FIG. 2(b), so that the loss of an MPE section or multiple sections does not affect the capability of the receiver to accurately switch on at the beginning of the next time sliced burst. When time-slicing is in use, the time-slice start and stop times are computed using the delta-t and the maximum_burst_duration fields in the headers of the time-sliced MPE sections. A time-sliced burst cannot start before the delta-t time which is signaled by the MPE section headers of the previous time-sliced burst and cannot end later than the time indicated by delta-t+maximum_burst_duration. The maximum allowed jitter as specified for example in the standard ETSI EN 301 192 V1.4.1 (2004-11) Digital Video Broadcasting (DVB); DVB specification for data broadcasting can also be taken into account.

When a burst of data is received by a DVB-H capable receiver, the data is buffered to be processed and presented during the off period between bursts. The burst size $S_b$, defined as the amount of network layer bits received in a burst-duration, has to be less than the buffer available at the receiver for the particular service. The maximum burst duration $t_b$ is also signaled for every time-sliced elementary stream so that, under poor reception conditions, the receiver can infer when the burst has ended.

The layer 3 datagrams are always carried in MPE sections regardless of whether MPE-FEC is used, thus enabling it to be fully backward compatible to MPE-FEC ignorant receivers. The last section in an ADT table contains a table_boundary flag that signals the end of layer 3 datagrams within the ADT. In a time-sliced scenario, an MPE-FEC-aware receiver, upon encountering a table_boundary_flag, checks if all ADT sections are received correctly, for example using a Cyclic Redundancy Check (CRC), and discards all remaining sections in the burst if all ADT sections are received correctly. If some of the ADT sections contain errors, then the RSDT sections are received and are used to attempt to correct the errors. An MPE-FEC-ignorant receiver simply ignores the MPE-FEC (the RSDT part of an MPE-FEC matrix) and switches off the receiver until the next burst.

Aural and visual information are important components of most multimedia services and applications operating over transmission systems. In order to transmit aural and visual information in the current generation of popular networks, compression arrangements have been standardized. Most of these compression arrangements use known human perceptual qualities along with efficient binary data coding schemes to reduce redundant information and compress the input information. Both audio and video compression arrangements process continuous blocks of uncompressed samples to use the psycho-acoustic and psycho-visual information for redundancy reduction.

In point-to-multipoint (PTM)-type communications, simulcasting is often used to deliver data to receivers with heterogeneous capability. In a PTM communication scenario when a sender is sending a single media stream to multiple receivers with heterogeneous capability, a fair distribution system should deliver the media to the receiver commensurate with the capabilities of the individual receivers. In practice, however, this is a difficult proposition to achieve. The "fairness" issue arises from the fact that PTM transmission involves a trade-off between bandwidth efficiency and granularity of control over the quality of reception to an individual receiver. In a single-rate PTM transmission, the media transmission rate is chosen to match the lowest receiver capacity in a particular session. This solution is sub-optimal both in terms of bandwidth usage and receiver heterogeneity. The simulcasting approach is used to address this issue of fair distribution, using the transmission of several streams of identical source media at varying transmission and presentation characteristics. For example, two streams of different picture sizes can be transmitted.

The use of time-slicing in DVB-H indicates that data of a program is sent to the receiver in high-bit-rate bursts at specific time intervals. When a receiver tunes into a program, it either tunes into the channel during the time interval when the time-sliced program data is being transmitted or during the off-time.

Two different possibilities are possible when a receiver tunes in. The first possibility is that the receiver tunes in during the ADT transmission of the time-sliced burst of the required program. A special case of tuning in during a burst is that that receiver tunes in just at the beginning of the time-sliced burst of the required program. The second possibility is that the receiver tunes in between consecutive time-sliced bursts of the required program. When the receiver tunes into a channel in the beginning or middle of the ADT transmission of a time-sliced burst, it can start data reception without any delay. However, when the receiver tunes into the channel after the ADT transmission of the time-sliced burst for the program has ended, it has to wait for an additional period of time before the next time-sliced burst for the program is transmitted. This delay can be anything from zero (exclusive) to the effective off-time period. FIGS. 3(a)-3(c) show the three different scenarios that can occur when a receiver tunes into a service transmitted in a time-sliced DVB-H channel. In FIG. 3(a) the tuning in occurs at the beginning of a burst n. In FIG. 3(b), the tuning in occurs in the middle of burst n. In FIG. 3(c), the tuning in occurs in between bursts n and n+1.

To estimate the probability that a receiver tunes into a time-sliced burst of a service, it is helpful to assume that the service bit rate is $b_s$ and the total DVB-H channel bandwidth for all services transmitted through it is $b_c$. If event $E_b$ is defined as the event when a receiver tunes into the time-slice burst during its transmission, then $P(E_b)$ is defined as the probability that this event occurs. This probability is given by $$P(E_b)=b_s/b_c \tag{1}$$

In equation (1), it is assumed that the service is using the full capacity of the channel. It is also possible that a service does not use the full capacity of the channel. For example, a time-sliced set of DVB-H services can be multiplexed with continuous DVB-T services into a single MPEG-2 transport stream. In such a parallel service case, $b_c$ is defined to be the total bandwidth available for the set of DVB-H services. The probability P(g) that the receiver tunes into an off-time of the service time-sliced burst is then given by $$P(E_t)=(b_c-b_s)/b_c \qquad (2)$$

$$P(E_t)=1-P(E_b) \qquad (3)$$

Equations (1), (2) and (3) reveal that when $b_s$ is much smaller than $b_c$, there is a very high probability that the receiver tunes into the service during the off-time of the service. This indicates that there is a high probability that the receiver has to wait for information when it tunes into a channel to receive a service.

Program P is a streamed audio-visual presentation. The audio and the video components are coded separately, multiplexed together, and time-sliced for carriage over the DVB-H radio network. A burst of P contains audio-visual data in an interval $[\tau_s, \tau_e]$. The time period during which data of P is transmitted is referred to as the burst-time $t_b$. The burst-time consists of two parts, burst-times for ADT ($t_{bADT}$) and RSDT ($t_{bRSDT}$). After the time interval $t_b$, no data of program P is transmitted for a time duration of $\Delta t$, referred to as the off-time. Analogously, after the transmission of the ADT of a burst, no application data of program P is transmitted for time duration of $\Delta t_e$, referred to as the effective off-time The cycle-time $\delta$ is defined as $\delta = t_b + \Delta t = t_{bADT} + \Delta t_e$, i.e., the time difference between the start time of consecutive time-sliced bursts. The tune-in initiation time $\tau_t$ is defined as that instant on the transmission curve time-line when the user decides to consume P and initiates action to receive data from the channel. The tune-in delay $\Delta_{(T-IN)}$ is defined as the amount of time elapsed after $\tau_t$ to the moment when the rendering of P starts. This is also referred to as channel zapping delay, channel-switch delay, and start-up delay. $\Delta_{(T-IN)}$ can be considered as a cumulative sum of the following component delays:

A1. Time-slice synchronization delay $\Delta_{(T-SYNC)}$.
A2. Delay to compensate potentially incomplete reception of the first time-sliced burst $\Delta_{(COMP)}$.
B. Reception duration of the first time-sliced burst $\Delta_{(RCPT)}$.
C. Delay to compensate the size variation of FEC $\Delta_{(FEC)}$.
D. Delay to compensate for the synchronization time between associated media streams (e.g. audio and video) $\Delta_{(M-SYNC)}$.
E. Delay until media decoders are refreshed to produce correct output samples denoted by $\Delta_{(REFRSH)}$.
F. Delay to compensate the varying bitrate of a media bitstream denoted by $\Delta_{(VBR-COMP)}$.
G. Processing delays of the receiver and player implementations denoted by $\Delta_{(PROC)}$.

Thus, $\Delta_{(T-IN)}$ can be given as $\Delta_{(T-IN)} = \Delta_{(T-SYNC)} + \Delta_{(COMP)} + \Delta_{(RCPT)} + \Delta_{(FEC)} + \Delta_{(M-SYNC)} + \Delta_{(REFRSH)} + \Delta_{(VBR-COMP)} + \Delta_{(PROC)}$ It should be noted that the above equation of $\Delta_{(T-IN)}$ is a simplification, as the delay to acquire the required transport-level signaling, such as Program Specific Information/Service Information (PSI/SI) and Entitlement Control Messages (ECM) for conditional access (CA), are not considered. Furthermore, it is assumed that no application-layer content protection is used and hence related delays, e.g., for acquiring the content protection keys, are omitted from the discussion. Finally, the delay jitter of burst intervals (Delta-t Jitter) is not handled as well but is straightforward to use as a guard interval in the activation of the radio reception.

The delay $\Delta_{(REFRSH)}$ is usually applicable to video only, whereas in audio, $\Delta_{REFRESH}$ would typically be equal to zero. The values of other delay components are often identical for both audio and video. $\Delta_{(T-SYNC)}$, $\Delta_{(COMP)}$, and $\Delta_{(RCPT)}$ are discussed in more details below.

As discussed above, there are two possibilities for the moment that the user initiated the switch of programs relative to the transmission of P. In the first possibility, tune-in occurs during a burst carrying P as illustrated in FIG. 3(b). In a special case, tune-in occurs exactly at the beginning of a burst carrying P (FIG. 3 (a)). In the second possibility, tune-in occurs in between two consecutive bursts of P as illustrated in FIG. 3(c).

Before analysis of these scenarios, two delays are defined. The first, referred to as the time-slice synchronization delay $\Delta_{(T-SYNC)}$, is defined as the time elapsed from the moment when the user initiates the desire to consume P to the moment when the receiver obtains data of P. The second, referred to as the incomplete data compensation delay $\Delta_{(COMP)}$, is the delay incurred to compensate for the playback duration of data that was not received before tune-in initiation time $\tau_t$ in the burst. This delay is applicable only when tune-in occurs in the middle of the burst transmission.

When the receiver tunes in during the burst-time for ADT, the decoding and/or playback has to be delayed by an amount that is equivalent to the playback duration of those coded data units that occurred in the burst prior to the tune-in initiation time in order to guarantee playback without any pause. In the special case, when a receiver tunes into P exactly at the beginning of a burst, all data for decoding the burst becomes available and hence $\Delta_{(COMP)}=0$. It is noted that it may not be possible to apply FEC decoding for error correction of an incompletely received time-sliced burst, as the amount of data columns that were not received may outnumber the correction capability of the FEC code. To keep the following delay analysis and equations simple, it is assumed that data is transmitted in decoding order, audio and video frames are interleaved in ascending order of decoding times, the decoding order is identical to the output order and the sampling curve is linear. Given these assumptions, the delay to compensate the incomplete reception of the first time-sliced burst becomes $$\Delta_{(COMP)}=\delta-(\tau_e-\tau_t).$$

Assuming a uniform random distribution of tune-in times during the first received burst, $\Delta_{(COMP)}$ ranges from 0 to $\delta$ and the expected $\Delta_{(COMP)}$ becomes $$E[\Delta_{(COMP)}]=\delta/2$$

The probability of tuning during a burst of a desired program is given by $$P(E_b)=t_{bADT}/\delta$$

When the receiver tunes into the program during the effective off-time period, it has to wait until the next time-sliced burst for the desired program starts. This delay can be anything from zero to the off-time period $\Delta t$. If the time instant when receivers tune into the channel is assumed to be uniformly distributed, then the probability $P(E_o)$ that a receiver tunes into an off-time is given by $$P(E_o)=\Delta t_e/\delta$$

The expected $\Delta_{(T-SNYC)}$ is $$E[\Delta_{(T-SNYC)}]=\Delta t/2$$

The reception duration of the time-sliced burst depends on the size of the first MPE-FEC frame containing the desired program, as well as the transmission bitrate for the MPE-FEC frame. DVB-H allows the service provider to select the size of the MPE-FEC frame in terms of the rows of the frame (256, 512, 768, or 1024), the number of application data columns in the frame, and the number of Reed-Solomon FEC columns in the frame. The transmission bitrate for the MPE-FEC frame depends on the bitrate of the MPEG-2 transport stream multiplex carrying the program which, in turn, depends largely on the modulation system used in the radio transmission. Furthermore, potential non-time-sliced services reduce the transmission bitrate of the time-sliced bursts accordingly.

It should be noted that if receivers started media decoding immediately when the first IP datagram of the program is received, i.e., during the reception of the WIPE-FEC frame, a corrupted IP datagram might not be correctable by FEC decoding before its rendering time. Hence, receivers should buffer an entire MPE-FEC frame and apply FEC decoding, if necessary, before decoding of the media streams.

Advanced Video Coding (AVC), also know as H.264/AVC, is a video coding standard developed by the Joint Video Team (JVT) of ITU-T Video Coding Expert Group (VCEG) and ISO/IEC Motion Picture Expert Group (MPEG). AVC includes the concepts of a Video Coding Layer (VCL) and a Network Abstraction Layer (NAL). The VCL contains the signal processing functionality of the codec—mechanisms such as transform, quantization, motion-compensated prediction, and loop filters. A coded picture consists of one or more slices. The NAL encapsulates each slice generated by the VCL into one or more NAL units.

Scalable Video Coding (SVC) provides scalable video bitstreams. A scalable video bitstream contains a non-scalable base layer and one or more enhancement layers. An enhancement layer may enhance the temporal resolution (i.e. the frame rate), the spatial resolution, and/or the quality of the video content represented by the lower layer or part thereof. In the SVC extension of AVC, the VCL and NAL concepts were inherited.

Multi-view Video Coding (MVC) is another extension of AVC. An MVC encoder takes input video sequences (called different views) of the same scene captured from multiple cameras and outputs a single bitstream containing all the coded views. MVC also inherited the VCL and NAL concepts.

Many video coding schemes utilize inter prediction, which is also referred to as temporal prediction and motion compensation. Inter prediction removes redundancy between subsequent pictures. H.264/AVC, as other today's video compression standards, divides a picture to a mesh of rectangles for each of which a similar block in one of the decoded reference pictures is indicated. The location of the prediction block is coded as motion vector that indicates the position of the prediction block compared to the block being coded.

Decoded pictures used for predicting subsequent coded pictures and for future output are buffered in the decoded picture buffer (DPB). The DPB management processes, including the storage process of decoded pictures into the DPB, the marking process of reference pictures, and the output and removal processes of decoded pictures from the DPB, are specified to enable efficient utilization of the buffer memory.

The reference picture management process in H.264/AVC is summarized as follows. The maximum number of reference pictures used for inter prediction, referred to as M, is indicated in the active sequence parameter set. When a reference picture is decoded, it is marked as "used for reference." If the decoding of the reference picture caused more than M pictures to be marked as "used for reference," then at least one picture must be marked as "unused for reference." The DPB removal process then removes pictures marked as "unused for reference" from the DPB if they are not needed for output as well. Each short-term picture is associated with a variable PicNum that is derived from the syntax element frame_num, and each long-term picture is associated with a variable LongTermPicNum that is derived form the long_term_frame_idx which is signaled by the memory management control operation (MMCO).

There are two types of operations for the reference picture marking: adaptive memory control and sliding window. The operation mode for reference picture marking is selected on picture basis. The adaptive memory control requires the presence of MMCO commands in the bitstream. The memory management control operations enable explicit signaling which pictures are marked as "unused for reference," assigning long-term indices to short-term reference pictures, storage of the current picture as long-term picture, changing a short-term picture to the long-term picture, and assigning the maximum allowed long-term index for long-term pictures. If the sliding window operation mode is in use and there are M pictures marked as "used for reference," the short-term reference picture that was first decoded picture among those short-term reference pictures that are marked as "used for reference" is marked as "unused for reference." In other words, the sliding window operation mode results in first-in-first-out buffering operations among short-term reference pictures. When some highest temporal layers are discarded, gaps in frame_num are present in the bitstream. In this case, the decoding process generates short-term "non-existing" pictures having the missing frame_num values. Such "non-existing" pictures are handled in the same way as normal short-term reference pictures in the sliding window reference picture marking process.

The hypothetical reference decoder (HRD), specified in Annex C of the H.264/AVC standard, is used to check bitstream and decoder conformances. The HRD contains a coded picture buffer (CPB), an instantaneous decoding process, a decoded picture buffer (DPB), and an output picture cropping block. The CPB and the instantaneous decoding process are specified similarly to any other video coding standard, and the output picture cropping block simply crops those samples from the decoded picture that are outside the signaled output picture extents. The DPB was introduced in H.264/AVC in order to control the required memory resources for decoding of conformant bitstreams. There are two reasons to buffer decoded pictures—for references in inter prediction and for reordering decoded pictures into output order. The DPB includes a unified decoded picture buffering process for reference pictures and output reordering. A decoded picture is removed from the DPB when it is no longer used as reference and needed for output. The maximum size of the DPB that bitstreams are allowed to use is specified in the Level definitions (Annex A) of H.264/AVC.

There are two types of conformance for decoders—output timing conformance and output order conformance. For output timing conformance, a decoder must output pictures at identical times compared to the HRD. For output order conformance, only the correct order of the output picture is taken into account. The output order DPB is assumed to contain a maximum allowed number of frame buffers. A frame is removed from the DPB when it is no longer used as a reference and needed for output. When the DPB becomes full, the earliest frame in output order is output until at least one frame buffer becomes unoccupied.

In the H.264/AVC standard, the required DPB size for decoding a bitstream is specified by the syntax element max_dec_frame_buffering. The syntax element num_reorder_frames indicates the maximum number of frames that precede any frame in the coded video sequence in decoding order and follow it in output order. According to this value, the decoder can start to output pictures as early as possible thus to reduce the end-to-end delay without overflowing the DPB.

SUMMARY OF THE INVENTION

Various embodiments provide a system and method for providing faster tuning into the chosen program in a time-sliced multicast and/or broadcast transmission environment. Multimedia data of the same source material but of different transmission (bit rate for example) and presentation (display size and sampling rate for example) characteristics are coded and compressed. According to various embodiments, simulcast programs of a simulcast session are time-sliced, placed maximally apart from each other in terms of transmission time, and sent over the DVB-H channel. As used herein, the term "simulcast session" refers to representing the same piece of content, the term "simulcast program" refers to independent representation of the content containing all media types, and the term "simulcast stream" refers to an independent stream of one media type.

With various embodiments, the expected tune-in time, i.e. the time from the moment a user switches channels via the user interface to the moment first media is played out, can be approximately reduced from $\delta/2$ to $\delta/(2k)$, where $\delta$ is the cycle time (i.e., the interval between the transmission start times of two bursts of the same simulcast program) and k is the number of the simulcast programs of the same simulcast session. If two replicated programs are used for a simulcast session of a service, the related tune-in delay components are reduced by about half, if three replicated programs are used for the simulcast of a service then the tune-in delay components are reduced by about one-third, etc. Various embodiments can be used to provide error resiliency of the broadcast/multicast stream by using representations of the lost packets from other replicated streams of the simulcast in the same session.

These and other advantages and features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 2(a) is a representation showing time-slicing in a DVB-H channel, where two time-sliced bursts along with parameters that define the bursts, and FIG. 2(b) is a representation showing the signalling of the delta-t in MPE section of a time-sliced burst;

FIG. 3(a) shows a scenario by which a receiver can tune into a service, where the tuning in occurs at the beginning of a burst n; FIG. 3(b) shows a scenario by which a receiver can tune into a service, where the tuning in occurs in the middle of burst n; and FIG. 3(c) shows a scenario by which a receiver can tune into a service, where the tuning in occurs in between bursts n and n+1;

FIG. 4 is a depiction of a simulcasting occurring over a time-sliced DVB-H channel where program start special handling is used;

FIG. 9(a) illustrates an arbitrarily selected tune-in point when simulcasting is not utilized; FIG. 9(b) illustrates an arbitrarily selected reception start point when simulcasting is not utilized; FIG. 9(c) illustrates a time-line of time-sliced bursts of the streams for different resolutions; and FIG. 9(d) illustrates a situation in which the receiver wishes to process the higher resolution stream, but in which the first time-sliced burst occurring after the tune-in point is of a lower resolution;

DETAILED DESCRIPTION OF VARIOUS EMBODIMENTS

Various embodiments provide a system and method for providing faster tuning into a chosen program in a time-sliced multicast and/or broadcast transmission environment, such as a DVB-H environment. Multimedia data of the same source material but of different transmission (e.g., bit rate) and presentation (e.g., display size and sampling rate) characteristics are coded and compressed. It is helpful to define a simulcast session S of the same source signal or the same multimedia source material as $S=\{P_i: 1 \leq i \leq k\}$ where S consists of k independently coded programs $P_i$, targeted at k different classes of receivers. The programs $P_i \forall i$, represent the same source, but coded at different qualities. Each program typically comprises more than one stream, such as an audio stream and a video stream. The programs of a simulcast session are time-sliced, placed maximally apart from each other in terms of transmission time, and sent over the DVB-H channel. Through the various embodiments, the related tune-in delay components, i.e. the time from the moment a user switches channels (i.e., programs of different origin, i.e., programs of different simulcast sessions) via the user interface to the moment first media is played out, are expected to reduce approximately from about $\delta/2$ to $\delta/(2k)$, where $\delta$ is the cycle-time (interval between the transmission start times of two bursts of the same simulcast program) and k is the number of the simulcast streams of the same program. For example, in the case of two simulcast programs for a simulcast session, the relevant tune-in delay components become approximately $\delta/4$. When compared to the expected tune-in time of a single-stream broadcast, a 50% saving is expected to be obtained.

Figure 5:
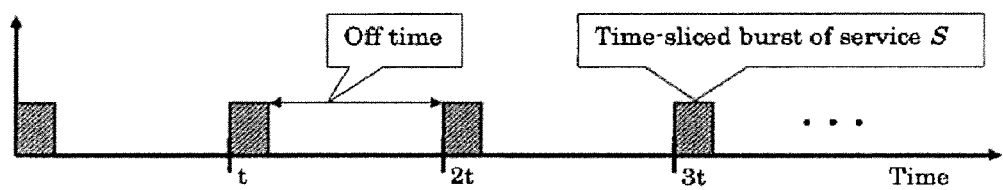
FIG. 5 shows how a single rate service is transmitted over a time-sliced DVB-H channel.
Figure 6:
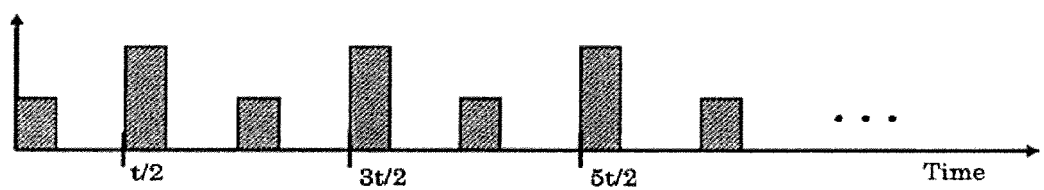
FIG. 6 shows how two simulcasts of the same service can be sent over a time-sliced DVB-H channel according to various embodiments.

The operation of the service infrastructure according to the invention is described herein in a simplified form as a simulcast session having two simulcast programs, $P_1$ and $P_2$. It is noted, however, that various embodiments can be generalized to any number of simulcast programs. Each program typically comprises more than one stream, such as an audio stream and a video stream. IP packets of both $P_1$ and $P_2$ are time-sliced and sent into the channel such that no time-sliced burst containing packets of $P_1$ can have packets of $P_2$. In one embodiment, the media data in all time-slices (except potentially those that start the program) across the simulcast streams of a program are of the same duration d. Due to temporary variations of media bitrate, the duration d of the media data in time-slices may also be somewhat varying but should be substantially constant on average. Consequently, the cycle-time is in one embodiment also equal to d. A time-sliced burst of $P_2$ is sent into the channel such that it is placed maximally apart from any time-sliced burst of $P_1$ in time. When the duration d of media data in time-slices is equal in simulcast streams, the interval between (the start of) consecutive time-sliced bursts of the simulcast session is equal to d divided by the number of simulcast programs in the simulcast session. FIGS. 5 and 6 show the relative transmission times without and with the use of simulcasting, respectively. The height of the bars illustrates the bitrate of the stream, and it is observable that the simulcast programs in FIG. 6 are of different bitrates.

In the following discussion of various embodiments, it is assumed that an analog media signal, such as audio and video, is digitized or sampled to obtain media samples. Examples of samples include an individual picture (i.e., an array of pixels) of a video sequence or a pulse-code-modulated (PCM) audio sample of a certain sampling frequency. Media playback time refers to the intended rendering (e.g., playout, playback, output) time of a media sample. The media playback position refers to the currently-played media sample on a timeline of all the media samples of a presentation.

In one embodiment, the transmission start times of each time-sliced burst and the start time of media in the burst are approximately synchronized. In other words, if a time-sliced burst contains media data in the range of $t_0$ to $t_1$, its transmission start time is $T_0$, and a time-sliced burst of another simulcast program of the same simulcast session contains media data in the range of $t_0+d$ to $t_1+d$, in which $d=(t_1-t_0)/2$, then the transmission start time of the second time-sliced burst should be $T_0+d$.

It is noted that the presented synchronization of media playback times and transmission start times of bursts is feasible at the start of a simulcast session only if the start of the simulcast programs in terms of media playback position is made such that the set of bursts containing one burst from each simulcast program of a simulcast session is transmitted back-to-back. For example and as illustrated in FIG. 4, the first burst of $P_1$ (denoted as $S_a$ in the figure) contains coded media samples for the range of 0 to d in playback time. The transmission of the first burst of $S_a$ is started in wall-clock time of $T_0$. The transmission duration (i.e., the burst-time) of the first burst of $S_a$ is equal to $d_x$. The first burst of $P_2$ (denoted as $S_b$ in the figure) is transmitted right after the first burst of $S_a$ and contains coded media samples for the range of a to d/2 in media playback time. The second burst of $S_a$ contains coded media samples for the range of d to 2d in playback time. The transmission of the second burst of $S_a$ is started in wall-clock time of $T_0+d$. The second burst of $S_b$ contains coded media samples for the range of d/2 to 2d−d/2 in playback time. The transmission of the second burst of $S_b$ is started in wall-clock time of $T_0+d/2$. The order of the first bursts of simulcast programs should be in ascending order of receiver capability. In other words, the simulcast program requiring the least capabilities from receivers should be sent first, followed by the simulcast program requiring the second least of receiver capabilities, etc. This order ensures that all receivers can receive and play the program right from its beginning.

Another method for arranging the media data of simulcast programs to bursts at the start of the simulcast session is as follows. The first MPE-FEC matrices for every simulcast program are transmitted back-to-back as one burst. It is assumed that the cycle-time δ for each simulcast program is identical after the second time-sliced burst for each stream. The first cycle-time for simulcast program i, $\delta_{i,1}$, is counted as follows:

$$\delta_{i,1}=(k-i+1)\times\delta/k; 1\leq i \leq k$$

The first burst of each simulcast program contains media samples approximately of the range of 0 to $\delta_{i,1}$.

In one embodiment, the cycle-time of all simulcast programs of a simulcast session is arranged to be constant (after the first cycle). As the bitrate for the simulcast programs is likely to differ significantly, achieving a constant cycle-time δ may require, e.g., the use of "parallel elementary streams" and/or a small number of rows in MPE-FEC matrices when the bitrate of the simulcast program is relatively low.

In one embodiment, the cycle-time of program $P_i$ is arranged to be an integer multiple of the cycle-time of program $P_j$, assuming that i>j and programs are ordered in ascending order in terms of required receiver capability. When placing the bursts of the simulcast programs maximally apart, only $(\delta_i/\delta_j)$-th bursts of program $P_j$ can be considered. Consequently, some of the bursts of $P_i$ and $P_j$ may be sent back-to-back. Other algorithms for placing bursts of simulcast programs apart are also possible.

In another embodiment, the second time-sliced bursts of a simulcast session are transmitted such that $P_{(k)}$ is sent first followed by $P_{(k-1)}$, etc. until $P_{(1)}$.

There are several options for arranging the packet order within a burst, including:
1. ascending order according to sampling instants (audio and video packets interleaved);
2. descending order according sampling instants (audio and video packets interleaved);
3. time-wise grouping of data units and transmission of groups in reverse decoding order relative to each other;
4. priority-wise grouping of data units and transmission of groups in ascending priority order;
5. priority-wise and time-wise grouping of data units (in that order) and transmission of priority groups in ascending priority order and time groups within priority groups in reverse decoding order; and
6. time-wise and priority-wise groups of data units (in that order) and transmission of time groups in reverse decoding order and priority groups within time groups in ascending priority order.

Each of these options is described below.

The ascending order of packets according to sampling instants (audio and video packets interleaved) is not particularly helpful for reducing the tune-in delay. Coded data units, such as Real-time Transport Protocol (RTP) packets, are ordered in ascending order of sampling instants, i.e., RTP timestamps in case of RTP packets. When tune-in occurs during the burst-time, the delay component to compensate potentially incomplete reception of the first time-sliced burst $\Delta_{(COMP)}$ is proportional to the tune-in initiation time relative to first sampling instant of the burst.

The descending order of packets according sampling instants (audio and video packets interleaved) enables receivers to obtain the first media packet of the burst, in decoding order, but is likely to result into a pause between the playback of the first and second received bursts.

For time-wise grouping of data units and transmission of groups in reverse decoding order relative to each other, it is helpful to consider consecutive bursts $D_i$ of service S of k simulcast programs such that i=1, 2, . . . , k, and $D_k$ is the first one of the considered bursts in transmission order. Let the time intervals contained in bursts $D_i$ be equal to $[\tau_{si}, \tau_{ei}]$. In order to reduce the tune-in delay, coded data units of burst $D_i$ for i>1 are split into two groups according to their sampling instants, the first and second groups consisting of data within $[\tau_{s(i-1)}, \tau_{ei}]$ and $[\tau_{si}, \tau_{s(i-1)}]$ respectively, and the packets of the first group are sent earlier than the packets of the second group. Similarly, coded data units of burst $D_j$ are transmitted as two groups containing data within $[\tau_{sk}, \tau_{e1}]$ and $[\tau_{s1}, \tau_{sk}]$ and the packets of the first of these groups are sent prior to the packets of the second group.

A receiver that desires to consume program $P_m$ receives the first time-sliced burst of any simulcast program in S that carries data either commensurate with or inferior to its capabilities. A receiver may also tune in to $D_i$, i>m, and decode the contents of $D_i$ in those parts that it is capable of, such as the audio track or intra pictures only. To simplify the analysis, it is assumed that any receiver is able to tune in to any burst $D_i$ with potentially reduced audio-video reproduction quality compared to the best achievable quality decodable from $D_i$. The expected probability to tune-in during any burst $D_i$ becomes $$P(E_{b,simulcast}) = k \times t_{bADT}/\delta$$

In order to analyze the reduction of tune-in delay when the reception started during any burst $D_i$, two cases are considered separately. First, when the reception started during the period of $[\tau_{s(i-1)}, \tau_{ei}]$, or $[\tau_{sk}, \tau_{e1}]$, i=1, all data in the period of $[\tau_{si}, \tau_{s(i-1)}]$, i>1, or $[\tau_{s1}, \tau_{sk}]$, i=1, respectively, will be received, provided that no transmission errors occur. The next received burst will contain the immediately subsequent period of data, hence enabling pauseless playback. This tune-in time range is referred to as the second playback portion of the burst and with subscript bs in the delay components. Second, subscript bf is used to denote that the reception started during the first playback portion of the burst, i.e., the period of $[\tau_{si}, \tau_{s(i-1)}]$, i>1, or $[\tau_{s1}, \tau_{sk}]$, i=1.

$\Delta_{(T-SYNC),bs}=0$ and $\Delta_{(FIRST),bs}=0$. The expected reception duration of the first burst and the expected probability of tuning in during the second playback portion of the burst are inversely proportional to the number of simulcast programs k in the service as follows:

$$E[\Delta_{(RCPT),bs}] = t_{bADT}/k + (t_{bADT} - t_{bADT}/k)/2 = t_{bADT} \times (k+1)/2k$$

$$P(E_{bs}) = P(E_{,simulcast}) \times (1 - 1/k)$$

When the tune-in occurred during the first playback portion of a burst, some data of the burst would be useful and hence $\Delta_{(T-SYNC),bf}=0$. However, as the tune-in point within the first playback portion is arbitrary, the expected delay to achieve pauseless playback is as follows:

$$E[\Delta_{(FIRST),bf}] = \delta/k/2$$

The expected reception duration of the first burst and the expected probability of tuning in during the first playback portion are as follows:

$$E[\Delta_{(FIRST),bf}] = \delta/k/2$$

$$P(E_{bs}) = P(E_{b,simulcast})/k = t_{bADT}/\delta$$

Priority-wise grouping of data units and transmission of groups in ascending priority order was reported to reduce tune-in delay in Multimedia Broadcast/Multicast System (MBMS) of 3GPP in D. Tian, V. K. Malamal Vadakital, M. M. Hannuksela, S. Wenger, and M. Gabbouj, "Improved H.264/AVC video broadcast/multicast," Proc. of Visual Communications and Image Processing (VCIP), July 2005. MBMS essentially uses continuous transmission, as observed by the application layer, rather than time-sliced transmission. It is expected that the impact of priority-wise grouping on tune-in delay reduction in time-sliced transmission is moderate. Priority-wise grouping of data units to different MPE-FEC matrixes to obtain unequal error protection as a function of priority has been proposed in V. K. Malamal Vadakital, M. M. Hannuksela, M. Rezaei, and M. Gabbouj, "Method for unequal error protection in DVB-H for mobile television," Proc. of IEEE International Symposium on Personal, Indoor and Mobile Radio Communications (PIMRC), September 2006. In the method, the multiplexed media datagrams corresponding to certain duration are encapsulated into two or more MPE-FEC matrices according to their priority label. These MPE-FEC matrices are referred to as peer MPE-FEC matrices. The number of peer MPE-FEC matrices in a time-sliced burst is equal to the number of unique priority labels assigned to the datagrams. The FEC code rates of the peer MPE-FEC matrices of a burst is selected such that the most important MPE-FEC matrix gets the strongest protection. The peer MPE-FEC matrices of a burst are transmitted in ascending order of priority, i.e., the most important MPE-FEC matrix as the last one, to reduce the expected tune-in delay and increase the number of decodable audio and video frames from the first burst.

Priority-wise grouping of data units takes advantage of the fact that different portions of the coded bit stream have different levels of importance to the overall subjective quality of the presentation. Priority partitioning is performed across all media streams of the same program. For example, the audio stream can be ranked as high priority. The priority partitioning methods for video can be roughly categorized into data partitioning, region-of-interest prioritization, spatial, quality and temporal layering.

Priority-wise and time-wise grouping of data units, as explained above, can be combined to achieve the benefits of both grouping methods—unequal error protection provided by the priority-wise grouping and reduced tune-in delay provided by the time-wise grouping. When time-wise grouping is performed first as an outer grouping mechanism, the expected tune-in delay is the same or slightly better compared to the use of the time-wise grouping only. However, unequal error protection would require the use of double the amount of peer MPE-FEC matrices compared to the use of priority-wise grouping only and the virtual interleaving depth of the peer MPE-FEC matrices is likely to be shallower, which may affect negatively to the overall error robustness. When priority-wise grouping is performed as an outer grouping mechanism, unequal error protection and error robustness is similar to what is achieved in V. K. Malamal Vadakital, M. M. Hannuksela, M. Rezaei, and M. Gabbouj, "Method for unequal error protection in DVB-H for mobile television," Proc. of IEEE International Symposium on Personal, Indoor and Mobile Radio Communications (PIMRC), September 2006. However, expected tune-in delay is greater than when using time-wise grouping only.

When a user switches channels, the receiver receives the first time-slice of any simulcast program of the desired simulcast session, regardless of the capability of the receiver. If the first received time-slice of the simulcast session is intended for receivers with capabilities lower than the receiver could process, then the receiver continues to decode and play the lower quality program until such point when a time slice of a simulcast program commensurate with its capability arrives. If the first time-slice of the simulcast session is intended for receivers with higher capabilities than the receiver could process, then the receiver nevertheless starts reception. In such a scenario, however, the receiver is not able to decode all of the received data and may have to perform post processing after decoding in order to properly present the media data based on the receiver's capabilities.

In one embodiment, multiple simulcast streams are only provided for a subset of the media components of a simulcast session, whereas only one stream is provided for the remaining media components. For example, two independent video streams originating from the same source video signal can be provided as simulcast streams, whereas only one audio stream is provided. The various embodiments are equally applicable to simulcast streams of one media type rather than simulcast programs containing a composition of media types. Media types having one stream in a simulcast session can be multiplexed to the same bursts with any of the simulcast stream of another media type, or can be transmitted in separate bursts.

The following example further illustrates various embodiments described herein. In this example, it is assumed that a video source is coded with, two different compression parameters. These streams are referred to as $S_a$ and $S_b$. $S_a$ is coded at picture size of Quarter Video Graphics Array (QVGA) (320×240 pixels), and $S_b$ is coded at picture size of Video Graphics Array (VGA) (640×480 pixels). IP packets of both $S_a$ and $S_b$ are time-sliced and sent into the channel such that no time-sliced burst containing packets of $S_a$ can have packets of $S_b$. Furthermore, it is assumed that a time-sliced burst of $S_a$ contains compressed video data of 1 sec duration. In this case, it is desirable that a time-sliced burst of $S_b$ also have a compressed video data of 1 second duration. A time-sliced burst of $S_b$ is then sent into the channel such that it is placed maximally apart from any time-sliced burst of $S_a$ in time. It should be noted that the arrangement for the start of the program is not considered in order to simplify the example.

Figure 8A:
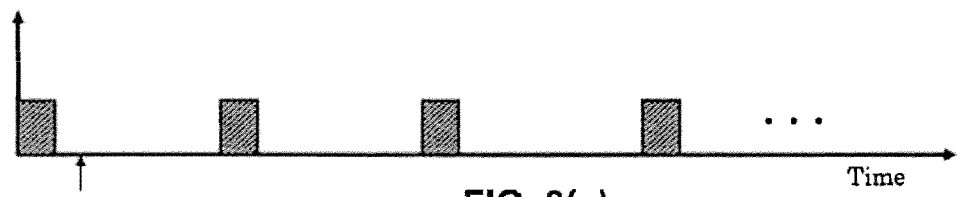
FIG. 8(a) shows time-sliced bursts of a single-rate stream, without simulcasting.
Figure 8B:
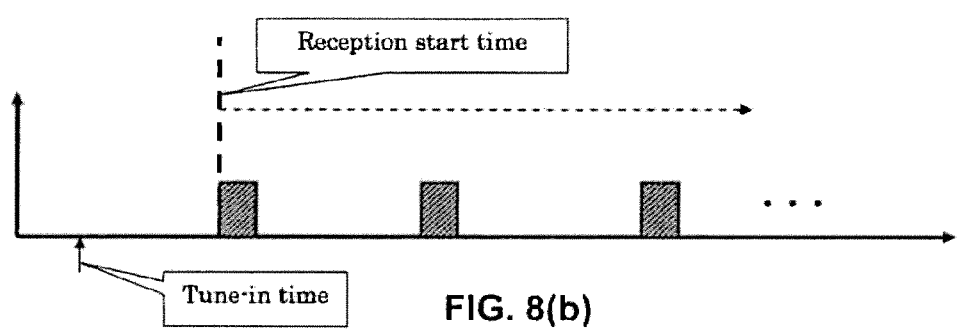
FIG. 8(b) shows the tune-in and reception of a single rate stream.
Figure 8C:
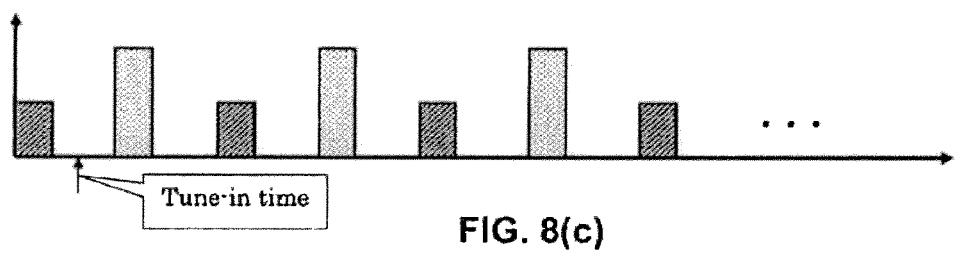
FIG. 8(c) shows time-sliced bursts of an example tune-in time to simulcast streams.
Figure 8D:
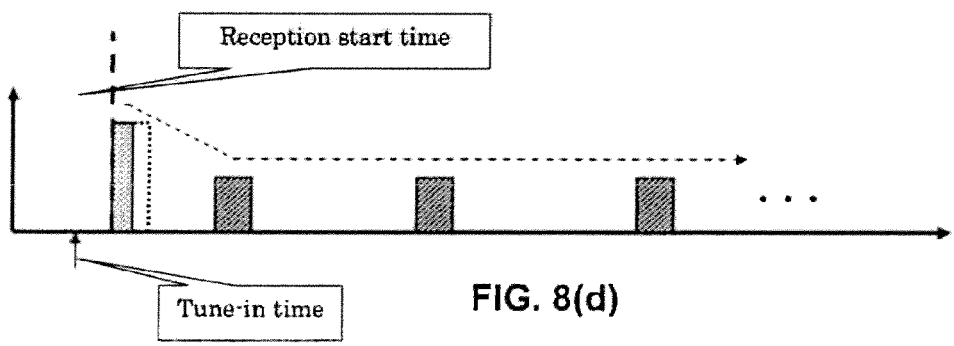
FIG. 8(d) is an illustration of the reception start time and received bursts of simulcast streams.

FIGS. 8(a)-8(d) are representations depicting when a receiver tunes in and actual reception start times with and without simulcasting according to various embodiments. FIG. 8(a) shows time-sliced bursts of a single-rate stream, without simulcasting. FIG. 8(b) shows the tune-in and reception of a single rate stream. FIG. 8(c) shows time-sliced bursts of an example tune-in time to simulcast streams. FIG. 8(d) is an illustration of the reception start time and received bursts of simulcast streams.

If two time-sliced bursts of $S_a$ are sent at relative time instants 0 sec and 1 sec, then the time-sliced bursts of $S_b$ are sent at relative time instants 0.5 sec (as depicted in FIG. 8(c)). Furthermore, the time-sliced bursts of $S_a$ correspond to the ranges from 0 to 1 second and from 1 to 2 seconds, respectively, in a relative media playback timeline, and the time-sliced burst of $S_b$ corresponds to the range from 0.5 to 1.5 seconds in a relative media playback timeline. If a receiver capable of receiving $S_a$, but not $S_b$, tunes into the channel at time instant 0.3, then the next time-sliced burst it can receive is that of $S_b$. Even though $S_b$ is not commensurate with its capabilities, it nevertheless receives at least the first half the time-sliced burst of $S_b$ as depicted in FIG. 8(d) (corresponding to the range from 0.5 seconds to 1 second in the media playback timeline), decodes the subset of pictures of which it is capable within the computational constraints of the receiver (which typically is at least the present intra-coded pictures), post processes (which, in this case, may require sub-sampling of the resulting VGA pictures to QVGA display), and plays out the data before it receives the next time-sliced burst suitable for its capabilities.

Figure 1:
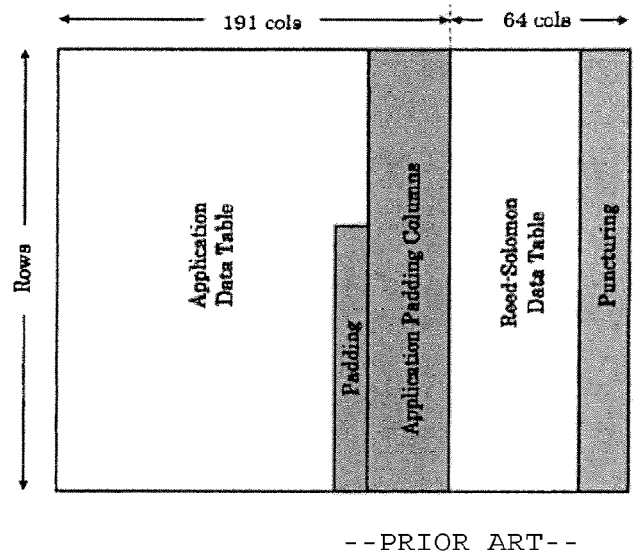
FIG. 1 is a representation of a structure of an MPE-FEC frame.
Figure 7:
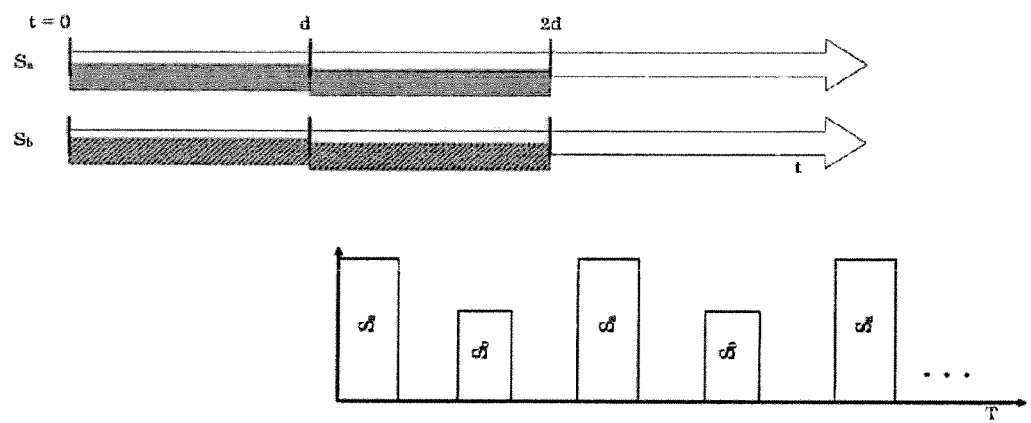
FIG. 7 is a depiction of a simulcasting occurring over a time-sliced DVB-H channel where no program start special handling is used.

In an alternative time-slicing arrangement to the synchronized transmission start times and media playback start times in bursts described above, all simulcast streams of a program can be time-sliced identically in terms of media playback ranges per bursts. For example, in the example scenario described above, the time-sliced burst of $S_b$ would correspond to the range from 0 to 1 second in the relative media playback timeline. Bursts are still placed maximally apart as described previously, but no special handling of the start of the program is needed. This arrangement is illustrated in FIG. 7, with no special handling involved. In the case of two simulcast streams for a program, the expected tune-in time becomes approximately d/4 or 3d/8 when the stream of $S_a$ or $S_b$, respectively, provides the desired picture size. These expected tune-in times are 50% or 25% smaller, respectively, compared to the expected tune-in time of a single-stream broadcast.

The following is a discussion demonstrating the improved tolerance against burst errors according to various embodiments. As noted previously, a receiver can receive a simulcast program of a simulcast session. If there are transmission errors that are unrecoverable in a time-sliced burst (referred to herein as burst A), then the receiver should receive the next time-slice burst (referred to herein as burst B) of any simulcast program of the same session. If burst B is intended for receivers with capabilities lower than the receiver could process, then the receiver can use all samples in burst B to conceal unrecoverable samples in burst A. If burst B is intended for receivers with capabilities higher than the receiver could process, then the receiver may only be able to use some of the samples in burst B given the limited computational and memory resources. If there are more than two simulcast programs for the same simulcast session, the receiver can use any subsequent time-sliced burst of the session, provided that it would be better suited for the receiver for concealment of burst A. It should be noted that it may not be possible to conceal the first samples of burst A with samples of burst B, as the playback time of some burst A samples may have already passed at the time burst B is received. Furthermore, it is noted that the decoding of samples in burst B may require the presence of a random access point, such as an Instantaneous Decoding Refresh (IDR) frame, in burst B. Alternatively, for some media formats, immediate decoding of samples regardless of the absence or presence of earlier samples is possible. Still further, it can be signaled that the multicast streams cause the identical management of samples for prediction references, and consequently no random access point is necessary. For example, identical management of samples is obtained when the same original pictures are encoded with two H.264/AVC encoders, the choice of reference and non-reference pictures is identical, and sliding window and adaptive reference picture marking processes are applied identically. It should also be noted that an IDR picture may be present in one stream, whereas another stream may contain a corresponding non-IDR picture with a memory management control operation equal to 5 (according to H.264/AVC), causing all the reference pictures to be marked as "unused for reference" and the values of frame_num and picture order count to be considered as 0 after the decoding of the picture. In other words, the impact of an IDR picture and a non-IDR picture with a memory management control operation equal to 5 is identical.

The following is a discussion of the implementation of various embodiments discussed herein. Various embodiments are based on a system in which datagrams are transmitted over DVB-H channel using time-slicing. The receivers can tune into a program carried by the channel by joining a broadcast/multicast (PTM) session. A program can be advertised using an electronic service guide (ESG). In the various embodiments and as described previously, a user tunes into a particular program at an arbitrary moment relative to the time-sliced transmission of the program. In a time-sliced DVB-H channel, tuning in can occur either during the transmission of a time-sliced burst of the program or in the off-time between the transmissions of two time-sliced bursts. According to one embodiment, a receiver (with the help of information from the ESG) is aware that a program in the ESG is available as more than one simulcast programs of a simulcast session and also has access to any of those simulcast programs. However, for proper reception, the receiver ideally must tune into the appropriate simulcast program commensurate with its capabilities.

According to various embodiments, a simulcast session contains simulcast programs, each having replicated media streams of different transmission and presentation characteristics, but a representation of the same media source. A simulcast session S has n simulcast programs. The bandwidth allocated to a simulcast session referred to as session bandwidth and restricts the total cumulative bit rate of the simulcast programs. In the simulcast session with all of its simulcast programs ($S_k$), the total number of programs n in the session S is greater than or equal to 2. The index k runs from 1 to n, with both k and n being positive integers.

A receiver, with the help of ESG, chooses to tune in to simulcast session S. The choice of the simulcast program within the session is made by matching the receiver's capability to the simulcast program characteristics. The receiver chooses the simulcast program that is best commensurate with its terminal capability. The receiver then becomes a part of the multicast groups for the streams in the simulcast program with m co-receivers tuned to the same simulcast program. The simulcast program with all its simulcast streams and the receivers can be represented as $S_k^r$.

It is helpful to consider a stream of a simulcast program of a simulcast session and refer to it and the streams of the same media type in the other simulcast programs of the same simulcast sessions as simulcast streams. Every simulcast stream of a session is sent in a separate time-sliced burst of a DVB-H channel. If $\alpha_i^s$ denotes the $i^{th}$ time-slice burst of the simulcast session S, then the time-sliced bursts $\alpha_i^s$ must contain all media datagrams of one simulcast stream k per a particular media type, and the time sliced burst $\alpha_{i-1}^s$ and $\alpha_{i+1}^s$ contains datagrams of a simulcast stream other than k of the same media type. For example, if the simulcast session S has two simulcast streams $S_1$ and $S_2$ of a particular media type, no time-sliced burst carrying the simulcast session S can have datagrams of stream $S_1$ and $S_2$ in the same time-slice.

In one embodiment, the start time for a time sliced burst carrying datagrams of simulcast stream k of simulcast session S is selected such that it is maximally apart from the start times of the time sliced bursts carrying datagrams of all other simulcast streams (of the same media type) other than k. For example, if a simulcast session S has two simulcast streams $S_1$ and $S_2$ (of a particular media type) and the start times for two adjacent time-sliced bursts carrying datagrams of $S_1$ are $t_i$ and $t_{i+1}$, then the start time of the time sliced burst carrying the datagrams of the simulcast stream $S_2$ is chosen such that it is maximally apart from $t_1$ and $t_{i+1}$, i.e., $(t_i+t_{i+1})/2$.

A receiver tuning into a simulcast session receives the first time sliced burst of any simulcast program in the simulcast session S irrespective of whether the simulcast stream was aimed for its capabilities. If the receiver tunes into a simulcast program that is superior to its capabilities, then it decodes a subset of received data and may have to perform post-processing so that it can start consumption of the media data. For example, if a receiver is capable of decoding and presenting a video stream at Quarter Common Intermediate Format (QCIF) (176×144 pixels) resolution but has tuned into a simulcast stream carrying datagrams with Common Intermediate Format (CIF) (352×288 pixels) resolution, then it decodes a subset of the coded pictures and down-samples the video frame resolution. If the receiver tunes into a simulcast program that is inferior to its capabilities, it continues to consume this inferior media until such time when a time-slice burst carrying the simulcast stream commensurate with its capability arrives. It can then switch to the simulcast program which carries datagrams tuned to its capabilities. Switching can occur at the earliest random access point, such as an IDR access unit of H.264/AVC video, in the simulcast program commensurate with the receiver capabilities.

There are a number of ways to arrange the operation of the content encoder and the content server. For example, the content encoder and the server may reside in the same physical device, or they may be included in separate devices. The content encoder and the server may operate with live real-time content, in which case the coded media bitstream is typically not stored permanently, but rather buffered for small periods of time in the content encoder and/or in the server to smooth out variations in processing delay, transfer delay, and coded media bitrate. The content encoder may also operate for a considerable amount of time before the bitstream is transmitted from the server. In this case, the system may include a content database, which may reside in a separate device or in the same device as the content encoder or the server.

The traditional task of IP encapsulator is to compute MPE-FEC for a certain duration of media IP packets, encapsulate it into MPE-FEC sections, and segment the MPE and MPE-FEC sections into smaller transport stream packets. In various embodiments discussed herein, however, the IP encapsulator has an additional task of ensuring that no time-sliced burst containing datagrams of a simulcast stream of a simulcast session contains data from another simulcast stream of the same media type of the same simulcast session. Differentiation between the simulcast streams of the same media type of a single simulcast session may be performed based on the multicast address in the IP header. Time-slice bursts for any simulcast program of the simulcast session are, in one embodiment, all approximately of the same duration. This is done to facilitate constant time-slice intervals maximally apart from each other, which consequently minimizes the expected tune-in delay. Transmission times of the time-sliced burst between programs of a simulcast session are appropriately set so that any time-sliced burst start time of a program in a simulcast session is maximally apart from other time-sliced burst start times of any other programs in the same simulcast session.

FIGS. 9(a) and 9(b) illustrate an arbitrarily selected tune-in point and a reception start point, respectively, when simulcasting is not utilized. The decoding of a lower or higher spatial resolution is desired in FIGS. 9(a) and 9(b), respectively, and consequently reception can start from the subsequent time-sliced burst for that resolution. FIG. 9(c) illustrates a time-line of time-sliced bursts of the streams for both resolutions. FIG. 9(d) illustrates the situation in which the receiver wishes to process the higher resolution stream, but in which the first time-sliced burst occurring after the tune-in point is of the lower resolution. In this scenario, the receiver receives the time-sliced burst of the lower resolution, and additionally decodes and renders data from the time-sliced burst of the lower resolution until the first time-sliced burst of the higher resolution is received.

A server, according to one embodiment, comprises a normal IP Multicast server using real-time media transport over Real-time Transport Protocol (RTP) as specified in Internet Engineering Task Force (IETF) Request for Comments (RFC) 3550 and 3551. IETF RFC 3550 can be found at www.ietf.org/rfc/rfc3550.txt, while IETF RFC can be found at www.ietf.org/rfc/rfc3551.txt. The server encapsulates the coded media bitstream into RTP packets according to an RTP payload format. Typically, each media type has a dedicated RTP payload format. It should be noted that a system may contain more than one server. For simplicity, however, the following description considers only one server. The server typically announces the availability media streams to the IP encapsulators using Session Description Protocol (SDP) over Real Time Streaming Protocol (RTSP). In other words, RTSP as specified in RFC 2326 (which can be found at www.ietf.org/rfc/rfc2326.txt) is used as the control protocol, the characteristics of the RTP streams are announced using SDP as specified in RFC 2327, which can be found at www.ietf.org/rfc/rfc2327.txt.

The server can use the SDP extension called the "grouping of media lines" discussed in RFC 3388 (which can be found at www.ietf.org/rfc/rfc3388.txt) to associate two RTP streams together. A new group attribute value, similar to lip synchronization (LS) and flow identification (FID) described in section 4 of RFC 3388, is also specified. This new attribute is referred to as alternate streams (AS). The AS identification tag in the "a=group" line indicates the alternate streams available in the simulcast. In order to encapsulate the alternate streams to different time-slices, the source IP address has to differ (as the source IP address is used to differentiate an IP stream from another IP stream in Program Specific Information (PSI)/Service Information (SI) of DVB-H). Therefore, the c attribute in SDP is used in the media-level to specify the destination IP address. An example of an SDP description according to the invention is as follows:

v=0
    o=Laura 289083124 289083124 IN IP4 one.example.com
    t=0 0
    a=group:AS 1 2
    a=group:AS 3 4
    m=video 30000 RTP/AVP 98
    i=This media stream provides lossless quality
    c=IN IP4 224.2.17.12/127
    b=AS:384
    a=rtpmap:98 H264/90000
    a=fmtp:98 profile-level-id=42A00C; packetization-mode=0;
    a=quality:10
    a=mid:1
    m=video 30000 RTP/AVP 99
    i=This media stream provides default compressed quality
    c=IN IP4 224.2.17.13/127
    b=AS:128
    a=rtpmap:99 H264/90000
    a=fmtp:99 profile-level-id=42A00B; packetization-mode=0;
    a=quality:5
    a=mid:2
    m=audio 30002 RTP/AVP 0
    c=IN IP4 224.2.17.12/127
    b=AS:64
    a=mid:3
    m=audio 30002 RTP/AVP 0
    c=IN IP4 224.2.17.13/127
    b=AS:32
    a=mid:4

The 3GPP Packet-Switched Streaming Service (as described in PSS, 3GPP Technical Specification 26.234) V6 defines a backwards-compatible method for signaling media alternatives in a single SDP file using the "alt" and "alt-default-id" attributes and the optional "alt-group" attribute. An old PSS client will simply ignore these attributes and will identify only one alternative per media. The "alt" and "alt-default-id" attributes may be used to signal the alternative simulcasts as discussed herein. The "alt" attribute is used to define the different fields and attributes for each of the existing simulcast streams. The "alt-default-id" is used to indicate the default media configuration. Any SDP media line except the "m=" line can be replaced for a given alternative. This is why all simulcasts must share the same port number and payload type. However, this is not seen as a restriction as long as the different media lines are sent to different destination IP addresses. Therefore, every new configuration should overwrite the connection line "c=" at the media level.

The "alt-group" attribute may also be used to group media streams into several alternatives based on grouping criteria such as bandwidth or language. Grouping based on the bandwidth is especially suitable for signalling the existence of the different simulcasts. This is the case because simulcasts of the same service typically are tailored for different Integrated Receiver Decoder (IRD) classes according to the ETSI Technical Specification 102 005 ("Digital Video Broadcasting (DVB); Specification for the use of Video and Audio Coding in DVB services delivered directly over IP protocols," v1.2.1 (2006-04) (a copy of which can be found at webapp.etsi.org/exchangefolder/ts_102005v010201p.pdf)) (e.g., one class for IRD-A, and one class for IRD-B terminals). Therefore, the different alternatives have different bandwidth requirements.

The following SDP example shows how the "alt" and "alt-group" attributes may be used in accordance with various embodiments:

v=0
    o=Laura 289083124 289083124 IN IP4 one.example.com
    t=0 0
    a=alt-group:BW:AS:448=1,3;192=2,4
    m=video 30000 RTP/AVP 98
    i=This media stream provides lossless quality
    c=IN IP4 224.2.17.12/127
    b=AS:384
    a=rtpmap:98 H264/90000
    a=fmtp:98 profile-level-id=42A00C; packetization-mode=0;
    a=quality:10
    a=alt-default-id:1
    a=alt:2:b=AS:128
    a=alt:2:i=This media stream provides default compressed quality
    a=alt:2:c=IN IP4 224.2.17.13/127
    a=alt:2:a=fmtp:99 profile-level-id=42A00B; packetization-mode=0;
    a=alt:2:a=quality:5
    m=audio 30002 RTP/AVP 100
    c=IN IP4 224.2.17.12/127
    b=AS:64
    a=rtpmap:100 AMR/12000
    a=fmtp:100 octet-align=1
    a=alt-default-id:3
    a=alt:4:c=IN IP4 224.2.17.13/127
    a=alt:4:b=AS:32
    a=alt:4:a=rtpmap:100 AMR/8000

The existence of alternate simulcast programs and streams can also be signalled in the ESG in a backward compatible manner. The ESG provides the service guide for all services available over a given DVB-H network. The ESG specification document [IP Datacast over DVB-H: Electronic Service Guide, ETSI TS 102 471; downloadable at webapp.etsi.org/ exchangefolder/ts_102471v010201p.pdf] defines the data model for providing the service guide. An ESG is defined also in the Service Guide of Open Mobile Alliance Mobile Broadcast Services (OMA BCAST Service Guide for Mobile Broadcast Services; Draft Version 1.0—4 Jan. 2007). Based on the displayed ESG information, the user can select a specific service. Furthermore, the ESG provides the necessary information for the terminal to connect to the related IP streams carrying the media streams of the selected service.

The data model is represented through an XML schema definition that applies to all ESG instances. An ESG instance comprises a set of ESG fragments and their relationships in conformance with the ESG data model. ESG defines several fragments such as the service fragment, schedule fragment, purchase fragment, and acquisition fragment. The acquisition fragment provides the necessary information to locate and access the service. The acquisition fragment also provides a description of the contents of the service in the component characteristic field. The complete syntax for this feature is specified in section 5.10.7.1 of the ESG specification document Sample syntax of the component characteristic element is as follows:

```
<complexType name="Component.CharacteristicType" abstract="true">
    <sequence>
        <element name="Bandwidth" type="tva:BitRateType"
        minOccurs="0"/>
    </sequence>
    <attribute name="purpose" type="string" use="optional"/>
</complexType>
<complexType name="VideoComponentType">
    <complexContent>
        <extension base="esg:ComponentCharacteristicType">
            <sequence>
                <element name="CodecCharacteristic"
                type="esg:VideoCodecCharacteristicType"
                minOccurs="0"/>
                <element name="FrameRate"
                type="tva:FrameRateType" minOccurs="0"/>
                <element name="OpenCaptionLanguage"
                type="language" minOccurs="0"/>
                <element name="SignLanguage"
                type="tva:SignLanguageType" minOccurs="0"/>
            </sequence>
        </extension>
    </complexContent>
</complexType>
<complexType name="VideoCodecCharacteristicType">
    <sequence>
        <element name="Codec" type="tva:ControlledTermType"
        minOccurs="0"/>
        <element name="ProfileLevelIndication"
        type="tva:ControlledTermType" minOccurs="0"/>
    </sequence>
</complexType>
<complexTypename="AudioComponentType">
    <complexContent>
        <extension base="esg:ComponentCharacteristicType">
            <sequence>
                <element name="Codec"
                type="tva:ControlledTermType"
                minOccurs="0"/>
                <element name="Mode"
                type="tva:ControlledTermType"
                minOccurs="0"/>
                <element name="Language"
                type="mpeg7:ExtendedLanguageType"
                minOccurs="0"
                maxOccurs="unbounded"/>
            </sequence>
        </extension>
    </complexContent>
</complexType>
```

In the ESG, there are two different ways to specify alternative simulcasts of the same content: in the Service fragment or in the ScheduleEvent fragment. In the Service fragment, several AcquisitionRef elements may be defined in order to refer to different alternatives for acquiring the same program. According to various embodiments, the existence of several references to different acquisition fragments should indicate alternative simulcasts of the same content and the description of each of the alternatives can be taken from the Component-Description metadata. The terminal is then able to deploy the herein specified mechanism for fast access to any of the alternative streams that come first in the DVB-H multiplex. Alternatively, the ScheduleEvent Fragment may also be used to link a content instance with the corresponding Service and several Acquisition fragments. This configuration is particularly beneficial when a content of limited (relatively short) duration is broadcast. The ScheduleEvent allows the definition of several AcquisitionRef elements for each content element. This should indicate alternative simulcasts of the same content. The terminal therefore knows how the different simulcasts are accessed and can then implement the various embodiments discussed herein. It should be noted that these mechanisms are backwards-compatible to the current ESG specification. Alternatively, an extension of the Acquisition-Fragment can be realized to indicate that the components of this service that are described through ComponentDescription elements are alternatives. This can be achieved by adding an attribute that gives the alternative group name to the ComponentDescription element as follows:

```
<complexTypename="ComponentDescriptionType">
    <sequence>
    <element name="ComponentCharacteristic"
    type="esg:ComponentCharacteristicType" minOccurs="0"
    maxOccurs="unbounded"/>
    <element name="SessionDescription"
    type="esg:SessionDescriptionBaseType"/>
    </sequence>
    <attribute name="AlternativeGroup" type="string" use=optional/>
</complexType>
```

The terminal is then able to identify alternative simulcasts based on the AlternativeGroup name, where components that share the same AlternativeGroup name are treated as alternatives.

For receivers that are unaware of the ESG signalling additions described herein, no changes in the receiver operation compared to the established systems are required.

Figure 10:
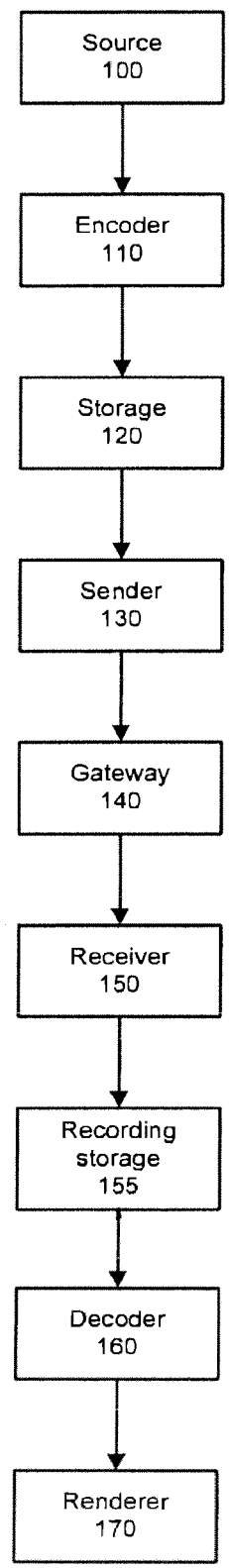
FIG. 10 is a representation of a generic multimedia communications system for use with various embodiments of the present invention.

FIG. 10 is a graphical representation of a generic multimedia communication system within which various embodiments of the present invention may be implemented. As shown in FIG. 10, a data source 100 provides a source signal in an analog, uncompressed digital, or compressed digital format, or any combination of these formats. An encoder 110 encodes the source signal into a coded media bitstream. It should be noted that a bitstream to be decoded can be received directly or indirectly from a remote device located within virtually any type of network. Additionally, the bitstream can be received from local hardware or software. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in FIG. 10 only one encoder 110 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the server 130 may reside in the same physical device or they may be included in separate devices. The encoder 110 and server 130 may operate with live real-time content, in which case the coded media bitstream is typically not stored permanently, but rather buffered for small periods of time in the content encoder 110 and/or in the server 130 to smooth out variations in processing delay, transfer delay, and coded media bitrate.

The server 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the server 130 encapsulates the coded media bitstream into packets. For example, when RTP is used, the server 130 encapsulates the coded media bitstream into RTP packets according to an RTP payload format. Typically, each media type has a dedicated RTP payload format. It should be again noted that a system may contain more than one server 130, but for the sake of simplicity, the following description only considers one server 130.

The server 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer or an RTP translator and typically acts as an endpoint of an RTP connection.

The system includes one or more receivers 150, typically capable of receiving, de-modulating, and de-capsulating the transmitted signal into a coded media bitstream. The coded media bitstream is transferred to a recording storage 155. The recording storage 155 may comprise any type of mass memory to store the coded media bitstream. The recording storage 155 may alternatively or additively comprise computation memory, such as random access memory. The format of the coded media bitstream in the recording storage 155 may be an elementary self-contained bitstream format, or one or more coded media bitstreams may be encapsulated into a container file. If there are many coded media bitstreams, such as an audio stream and a video stream, associated with each other, a container file is typically used and the receiver 150 comprises or is attached to a container file generator producing a container file from input streams. Some systems operate "live," i.e., omit the recording storage 155 and transfer coded media bitstream from the receiver 150 directly to the decoder 160. In some systems, only the most recent part of the recorded stream, e.g., the most recent 10-minute excerption of the recorded stream, is maintained in the recording storage 155, while any earlier recorded data is discarded from the recording storage 155.

The coded media bitstream is transferred from the recording storage 155 to the decoder 160. If there are many coded media bitstreams, such as an audio stream and a video stream, associated with each other and encapsulated into a container file, a file parser (not shown in the figure) is used to decapsulate each coded media bitstream from the container file. The recording storage 155 or a decoder 160 may comprise the file parser, or the file parser is attached to either recording storage 155 or the decoder 160.

The coded media bitstream is typically processed further by a decoder 160, whose output is one or more uncompressed media streams. Finally, a renderer 170 may reproduce the uncompressed media streams with a loudspeaker or a display, for example. The receiver 150, recording storage 155, decoder 160, and renderer 170 may reside in the same physical device or they may be included in separate devices.

Figure 11:
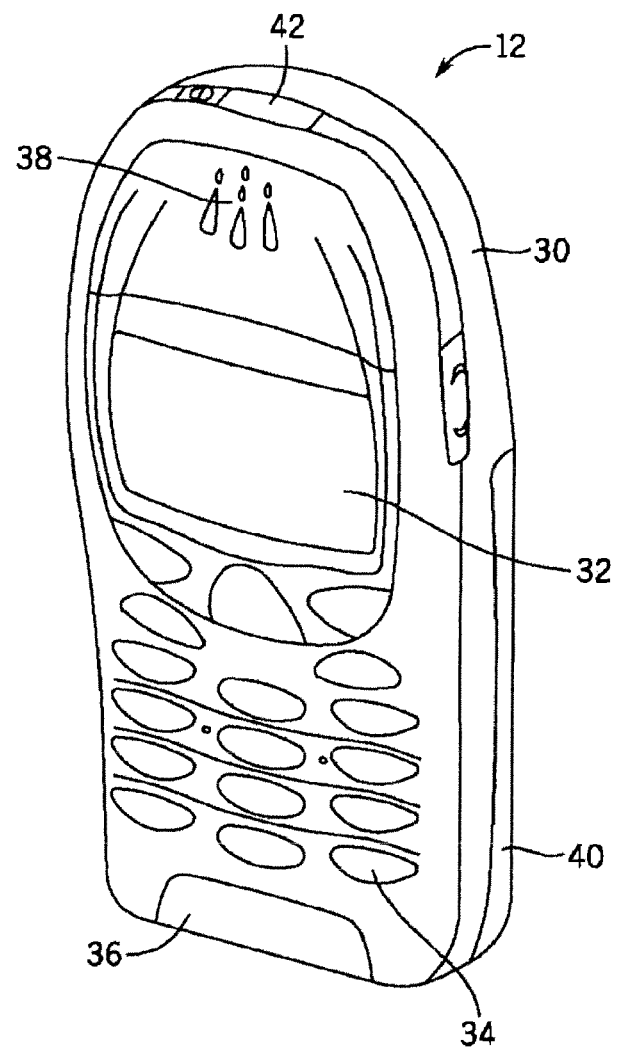
FIG. 11 is a perspective view of an electronic device that can be used in conjunction with the implementation of various embodiments of the present invention.
Figure 12:
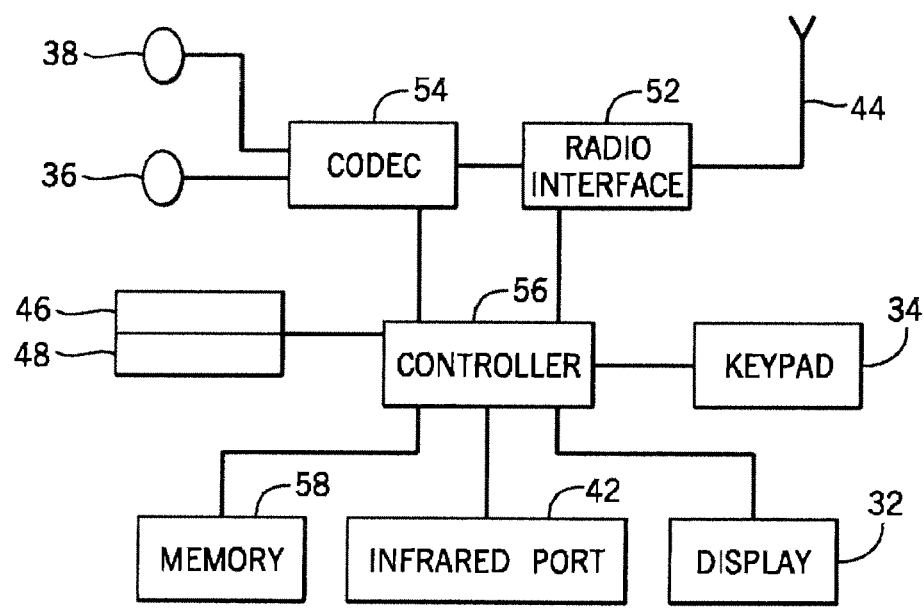
FIG. 12 is a schematic representation of the circuitry which may be included in the electronic device of FIG. 11.

FIGS. 11 and 12 show one representative electronic device 12 within which various embodiments may be implemented. It should be understood, however, that the various embodiments are not intended to be limited to one particular type of device. The electronic device 12 of FIGS. 11 and 12 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art, for example in the Nokia range of mobile telephones.

The various embodiments described herein are described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Individual and specific structures described in the foregoing examples should be understood as constituting representative structure of means for performing specific functions described in the following claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

Software and web implementations of various embodiments can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments have been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated.

The invention claimed is:

1. A method comprising:
   generating a first coded data stream and a second coded data stream representing the same content coded at different qualities, the first coded data stream and the second coded data stream being independently decodable from each other; and
   alternately transmitting portions of the first coded data stream and the second coded data stream in non-overlapping time-sliced bursts,
   wherein the transmission of the portions of the first and second coded data streams occur subsequently to each other in transmission order and substantially without delay between transmission of data.

2. The method of claim 1, wherein the different qualities include one or more of bit rate, display size, sampling rate, or compression parameters.

3. The method of claim 1, wherein the content includes media data and the media data in all time slices are substantially of the same duration.

4. The method of claim 1, wherein the alternately transmitted time sliced bursts of the first coded data stream and the second coded data stream are placed maximally apart from each other.

5. The method of claim 1, wherein the alternately transmitted portions of the first coded data stream and the second coded data stream are transmitted in order of receiver capability.

6. An apparatus comprising:
   a processor;
   a memory including program computer code;
   the computer program code configured to, when executed by the processor, cause the apparatus to:
      generate a first coded data stream and a second coded data stream representing the same content coded at different qualities, the first coded data stream and the second coded data stream being independently decodable from each other; and
      alternately transmit portions of the first coded data stream and the second coded data stream in non-overlapping time-sliced bursts,
      wherein the transmission of the portions of the first and second coded data streams occur subsequently to each other in transmission order and substantially without delay between transmission of data.

7. The apparatus of claim 6, wherein the different qualities include one or more of bit rate, display size, sampling rate, or compression parameters.

8. The apparatus of claim 6, wherein the content includes media data and the media data in all time slices are substantially of the same duration.

9. The apparatus of claim 6, wherein the computer program causes the apparatus to place the alternately transmitted time sliced bursts of the first coded data stream and the second coded data stream maximally apart from each other.

10. The apparatus of claim 6, wherein the computer program causes the apparatus to transmit the alternately transmitted portions of the first coded data stream and the second coded data stream in order of receiver capability.

11. A method comprising:
    alternately receiving in non-overlapping time sliced bursts, a first coded data stream and a second coded data stream representing the same content coded at different qualities, the first coded data stream and the second coded data stream being independently decodable from each other; and
    decoding a subset of the received non-overlapping time sliced bursts of the first coded data stream and a subset of the received non-overlapping time sliced bursts of the second coded data stream,
    wherein the transmission of the portions of the first and second coded data streams occur subsequently to each other in transmission order and substantially without delay between transmission of data.

12. The method of claim 11, wherein the different qualities include one or more of bit rate, display size, sampling rate, or compression parameters.

13. The method of claim 11, wherein the content includes media data and the media data in the time slices are substantially of the same duration.

14. The method of claim 1, wherein the alternately received time sliced bursts of the first coded data stream and the second coded data stream are placed maximally apart from each other.

15. The method of claim 1, wherein the alternately received portions of the first coded data stream and the second coded data stream are received in order of receiver capability.

16. An apparatus comprising:
    a processor;
    a memory including program computer code;
    the computer program code configured to, when executed by the processor, cause the apparatus to:
       alternately receive in non-overlapping time sliced bursts, a first coded data stream and a second coded data stream representing the same content coded at different qualities, the first coded data stream and the second coded data stream being independently decodable from each other; and
       decode a subset of the received non-overlapping time sliced bursts of the first coded data stream and a subset of the received non-overlapping time sliced bursts of the second coded data stream, wherein the transmission of the portions of the first and second coded data streams occur subsequently to each other in transmission order and substantially without delay between transmission of data.

17. The apparatus of claim 16, wherein the different qualities include one or more of bit rate, display size, sampling rate, or compression parameters.

18. The apparatus of claim 16, wherein the content includes media data and the media data in all time slices are substantially of the same duration.

19. The apparatus of claim 16, wherein the alternately received time sliced bursts of the first coded data stream and the second coded data stream are placed maximally apart from each other.

20. The apparatus of claim 16, wherein the alternately received portions of the first coded data stream and the second coded data stream are received in order of receiver capability.

* * * * *

UNITED STATES PATENT AND TRADEMARK OFFICE
CERTIFICATE OF CORRECTION

PATENT NO. : 8,831,039 B2  
APPLICATION NO. : 13/793589  
DATED : September 9, 2014  
INVENTOR(S) : Miska Matias Hannuksela, Vinod Kumar Malamal Vadakital and Imed Bouazizi Page 1 of 1

It is certified that error appears in the above-identified patent and that said Letters Patent is hereby corrected as shown below:

In the specification  
Column 3, Line 9, "duration;" should read -- duration, --;  
Column 5, Line 1, "P(g)" should read -- $P(E_i)$ --;  
Column 7, Line 7, "WIPE-" should read -- MPE --;  
Column 10, Line 36, "S={$P_i$: 1≤i≤k}" should read -- S={$P_i$: 1≤i≤k}, --;  
Column 10, Line 38, "$P_i$ ∀i," should read -- $P_i$ ∀ i, --;  
Column 11, Line 50, "a" should read -- $d_x$ --;  
Column 13, Line 6, "$D_j$" should read -- $D_1$ --;  
Column 13, Line 26, "or" should read -- i>1, Line or --;  
Column 13, Line 44, "P(E,simulcast)" should read -- $P(E_{b,simulcast})$ --;  
Column 13, Line 57, "E[Δ(FIRST)," should read -- $E[\Delta(_{RCPT})$, --;  
Column 15, Line 19, "with," should read -- with --;  
Column 17, Line 57, "$t_1$" should read -- $t_i$ --.

Signed and Sealed this  
Ninth Day of August, 2016

Michelle K. Lee  
*Director of the United States Patent and Trademark Office*